(12) United States Patent
Frederick et al.

(10) Patent No.: US 6,657,199 B2
(45) Date of Patent: Dec. 2, 2003

(54) FLEXIBLE DYNAMIC HOUSING

(75) Inventors: Larry D. Frederick, Huntsville, AL (US); Dwight Medley, Kelso, TN (US)

(73) Assignee: General Electric Company, Schenectady, NY (US)

( * ) Notice: Subject to any disclaimer, the term of this patent is extended or adjusted under 35 U.S.C. 154(b) by 11 days.

(21) Appl. No.: 10/028,430

(22) Filed: Dec. 28, 2001

(65) Prior Publication Data

US 2002/0195564 A1 Dec. 26, 2002

Related U.S. Application Data

(60) Provisional application No. 60/295,808, filed on Jun. 6, 2001.

(51) Int. Cl.$^7$ ................................................ G01T 1/20
(52) U.S. Cl. .............................. 250/361 R; 250/336.1
(58) Field of Search ........................ 250/361 R, 300, 250/483.1, 389, 256

(56) References Cited

U.S. PATENT DOCUMENTS

| | | |
|---|---|---|
| 2,902,603 A | 9/1959 | Ferre |
| 3,265,893 A | 8/1966 | Rabson et al. |
| 3,930,160 A | 12/1975 | Swinehart |
| 3,950,647 A | 4/1976 | Piltingsrud |
| 4,649,276 A | 3/1987 | Suzuki |
| 4,833,320 A | 5/1989 | Hurlbut |
| 4,900,937 A | 2/1990 | Dayton et al. |
| 4,904,865 A | 2/1990 | Meisner et al. |
| 4,994,673 A | 2/1991 | Perna et al. |
| 5,015,860 A | 5/1991 | Moses |
| 5,015,861 A | 5/1991 | Derenzo et al. |
| 5,047,635 A | 9/1991 | Leaney et al. |
| 5,059,798 A | 10/1991 | Persyk |
| 5,061,849 A | 10/1991 | Meisner et al. |
| 5,070,249 A | 12/1991 | White |
| 5,742,057 A | 4/1998 | Frederick et al. |
| 5,753,919 A | 5/1998 | Prain et al. |
| 5,796,109 A * | 8/1998 | Frederick et al. ........... 250/368 |
| 5,962,855 A | 10/1999 | Frederick et al. |
| 6,222,192 B1 | 4/2001 | Sekela et al. |
| 6,355,932 B1 | 3/2002 | Frederick |
| 6,359,282 B1 | 3/2002 | Sekela |
| 6,465,788 B1 | 10/2002 | Medley |

* cited by examiner

*Primary Examiner*—David Porta
*Assistant Examiner*—Christine Sung
(74) *Attorney, Agent, or Firm*—Nixon & Vanderhye P.C.

(57) ABSTRACT

A flexible dynamic support housing for a gamma detector is described. The gamma detector includes a scintillation assembly and an electronics module housed within a rigid housing. Elongated springs extend along the length of the rigid housing. The springs are located within an outer flexible housing, making up an outer flexible dynamic support housing. The outer flexible dynamic support housing, when placed within a generally cylindrical cavity in a machine, takes on a generally cylindrical outer shape. The scintillation assembly includes a crystal sealed within a sealed rigid scintillation housing, and the electronics module includes a photo-multiplier tube contained within a rigid electronics module housing. An inner flexible dynamic housing assembly, including springs and an inner flexible housing, is positioned between the rigid housing on the outside and the sealed rigid scintillation housing and the sealed rigid electronics module housing on the inside.

13 Claims, 5 Drawing Sheets

FLEXIBLE DYNAMIC HOUSING

This application claims the benefit of U.S. Provisional Application No. 60/295,808, filed Jun. 6, 2001, the entire content of which is hereby incorporated by reference in this application.

BACKGROUND

Nuclear detectors are used throughout the oil drilling industry for a variety of purposes. In some cases gamma detectors or neutron detectors are lowered into a well to log the formations. In measurement-while-drilling and logging-while-drilling operations, various instruments, including gamma or nuclear detectors, are mounted in a cavity in a drilling tool and used on a real time basis to make critical measurements while the drilling is taking place. In most all of these applications, the space available for installing instruments is very limited. Previous patents have provided for larger detector elements within available space by making more efficient use of the space within gamma detector elements, such as within the scintillation package. However, conventional designs have not fully addressed an important aspect of installing detectors in the drilling tools and mining equipment. Specifically, there is a need to provide shock and vibration isolation for the complete detector assembly and to provide mechanical compliance to the shape of the cavity in the tool, and to do so while using a minimum of space.

Due to the configuration and operational requirements of oil drilling tools, the typical configuration of a nuclear detector and other instrument packages in drilling tools is cylindrical. The cylindrical shape of photo-multiplier tubes, the relative ease of installing circular optical windows, and other considerations often favor a detector being of a cylindrical shape. The trend in recent years has been to reduce the diameter of drilling tools, resulting in less space being available for detectors. The most immediate effect is the necessity to reduce the diameter of the sensor package and associated electronics. In order to retain as much sensitivity of the detector as possible, the length of the scintillation elements are sometimes increased in order to increase the surface and volume available to detect gamma rays. The reduction in space similarly places constraints upon the size of the instrumentation and computer modules associated with the detectors. Therefore, there is a general need to be able to integrate more functions into smaller spaces while maintaining mechanical compliance, thermal compliance, and dynamic suspension.

Best utilization of available space within a drilling tool or mining machine would be achieved by making the nuclear detector assembly, or other instrument package, essentially the same size as the available cavity in the tool or machine. However, such an approach requires that the size and shape of the cavity and the size and shape of the detector be highly controlled. This constraint on the hardware can be expensive and limits interchangeability. Further, differential thermal expansion can damage the hardware unless provisions are made.

The conventional approach has been to use an elastomeric material around the detector assembly, in the shape of boots, pads, or o-rings. In order for an elastomeric material to provide sufficient movement to satisfy the required objectives while also accommodating thermal expansion at the high temperatures, thicker elastomeric materials are needed which use more space. Thicker elastomeric materials tend to lower the resonant frequency of the support assembly thus transmitting high levels of vibration into the instrument. It is desirable in most cases to provide for dynamic isolation but to do so without producing a natural resonant frequency near the frequencies of high levels of induced vibrations or shocks.

A major disadvantage of applying springs in a typical manner is that the springs do not exhibit a high level of damping resulting in high dynamic responses at resonant frequencies. Even elastomers, which have higher damping characteristics than metallic springs, have significant "Q" values which result in damaging resonant responses when vibrations having a frequency near the resonant frequency enter the detector assembly.

The need for a more space efficient way to provide good dynamic isolation and high levels of damping to allow for enlarged scintillation elements or photomultiplier tubes by making use of flat, or slightly shaped, elongated radial springs has been previously considered. This has proven to be effective inside detector, sensor and electronic assemblies. However, physical constraints and operational considerations make it difficult, if not impossible, in some instances to install such springs around complete gamma detector assemblies or instrument packages.

Oil drilling tools typically provide separate pressure cavities for individual elements of the instrumentation system to protect the instruments from high pressures of up to 25,000 pounds per square inch (psi) or more. The instrumentation elements within these cavities are interconnected with wiring to exchange signals. In some instances, segments of the instrumentation are integrated into modules which are then enclosed in a single pressure cavity. In order to maximize the use of space in the tool, there is a need to integrate more of the electronic elements within a single module. Effective dynamic suspension of the elements within the instrument module and dynamic suspension around such modules can both be important to increasing the reliability of components within.

SUMMARY

The invention provides important and substantial solutions to the problems described above.

The invention relates to electro-optical devices and other electronics and instrumentation used in harsh environments to detect and quantify nuclear radiation, such as, for example, oil drilling or solid mineral mining operations. More specifically, the current invention relates to maximizing use of space available for installing a nuclear detection device, or other instrumentation device. A flexible dynamic housing described herein allows a device to be compliant with the geometry and thermal dynamics of the cavity into which it is to be installed, such that the device is effectively isolated from damaging vibrations and shock. Installation is made easier and more reliable. Equipment supported in this manner can be expected to have a longer operational life due to the softer ride that they receive.

The flexible dynamic housing uses metallic springs that have predictable, repeatable mechanical properties. Such springs are much thinner than would be required for elastomers to provide an equivalent amount of dynamic isolation. Further, the springs are not as affected by temperature as are elastomers. As the temperature increases into the range of 150 degrees Celsius to 200 degrees Celsius or more, elastomers expand causing them to be compressed within the contained space in which they are used, resulting in the dynamic properties changing. The properties of the metallic springs employed in the flexible dynamic housing are affected much less by temperature changes and do not degrade, or take a set, with time at temperature.

The typical shape of a nuclear detector assembly or instrumentation package in a drilling tool, and certain other applications, such as, for example, mining applications, is cylindrical. The placement of linear springs along the length of the detector and between the detector and the cavity into which the detector is placed, is an effective way to solve some of the known problems. Such springs provide the desired shock and vibration isolation, provide compliance between small variations in the shape of the detector or the cavity, and provide compliance for changes in geometry due to differential thermal expansion. Another advantage of the flexible dynamic housing is the support is distributed along the length of the package reducing bending and shear forces during high shock and vibration.

These and other advantages and features will be more readily understood from the following detailed description of preferred embodiments of the invention which is provided in connection with the accompanying drawings.

DETAILED DESCRIPTION OF PREFERRED EMBODIMENTS

Figure 1:
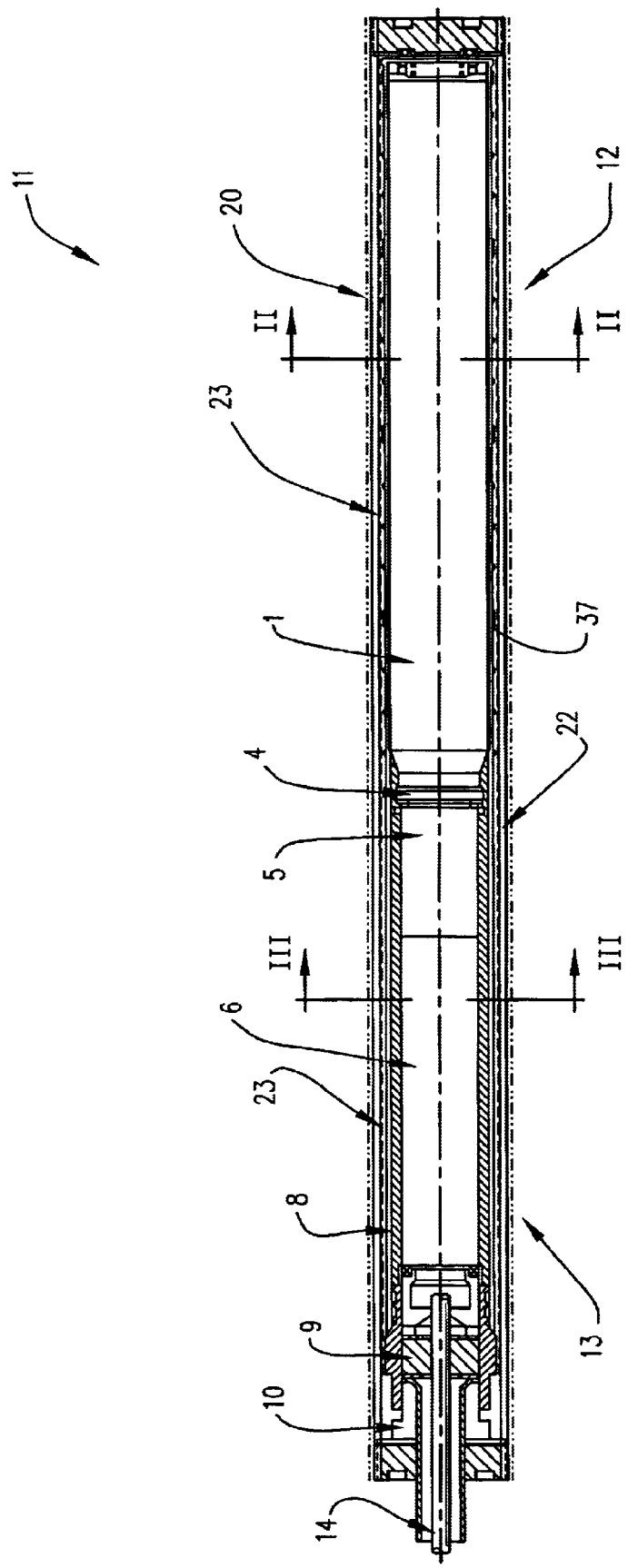
FIG. 1 is a cross-sectional side view of a gamma detector within a flexible dynamic housing constructed in accordance with an embodiment of the invention.
Figure 3:
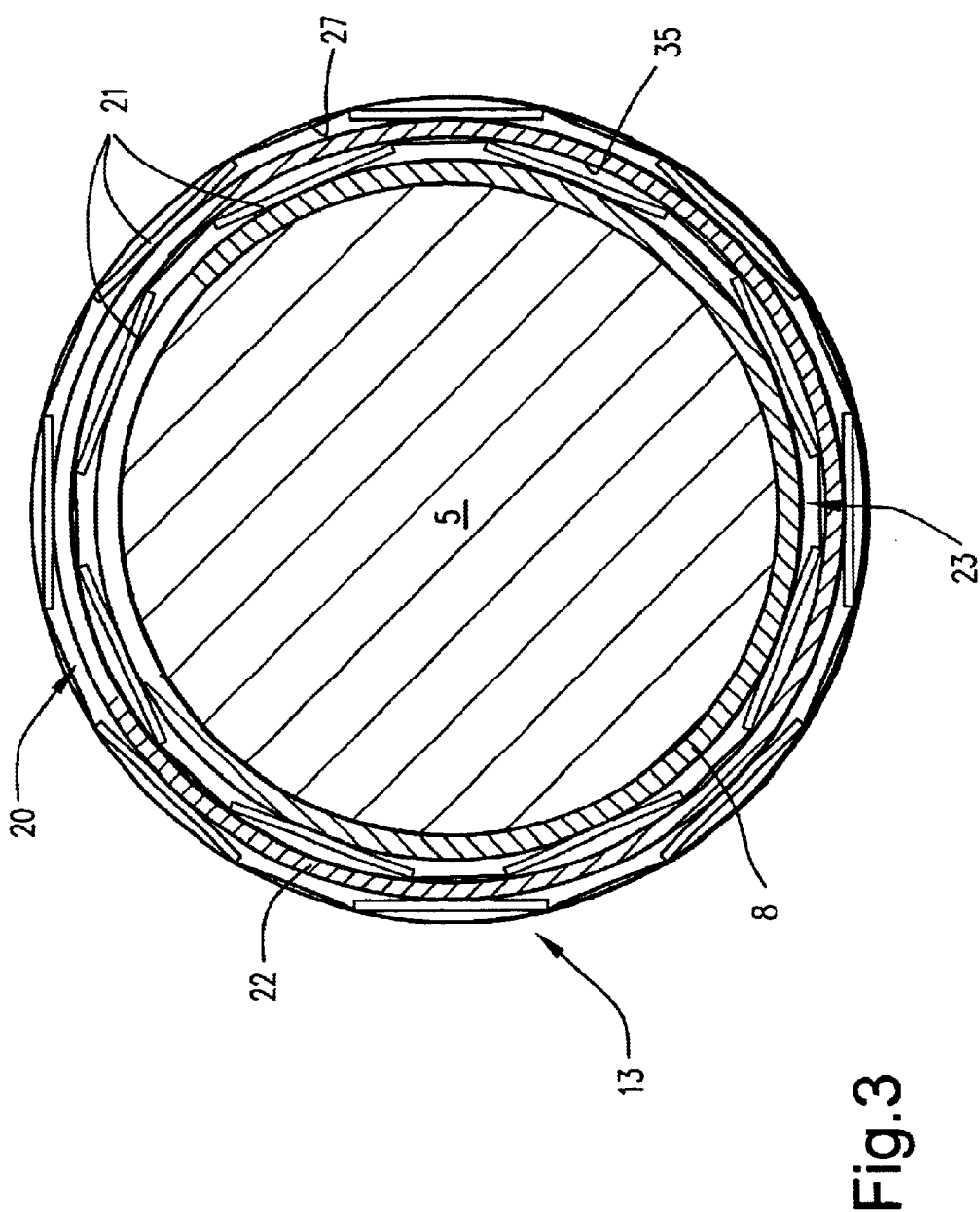
FIG. 3 is a cross-sectional view taken along line III—III of FIG. 1.

Referring to FIG. 1, a gamma detector assembly 11 includes two major assemblies, a scintillation assembly 12 and an electronics module 13. An optical window 4 allows light from scintillation formed in the scintillation assembly 12 to pass into the electronics module 13. Electrical pulses are formed in the electronics module 13, where these pulses are conditioned, measured, separated by energy levels, counted, analyzed and logical decisions are sent through a cable 14 to operators and other devices in the mining equipment. As illustrated, a known photo-multiplier tube 5 and a known electronics package 6 are part of the electronics module 13 and are protected from the environment by a sealed rigid electronics module housing 8. Conventionally, a pressure seal is provided by a nut 10 that compresses a gland 9 to seal around the exiting cable 14. Positioned exterior to the electronics module 13 is an inner flexible dynamic housing assembly 23 that includes a plurality of springs 21 and an inner flexible housing 35 (FIG. 3). The inner dynamic housing assembly 23 is positioned between the sealed rigid electronics module housing 8 and a rigid housing 22.

Figure 2:
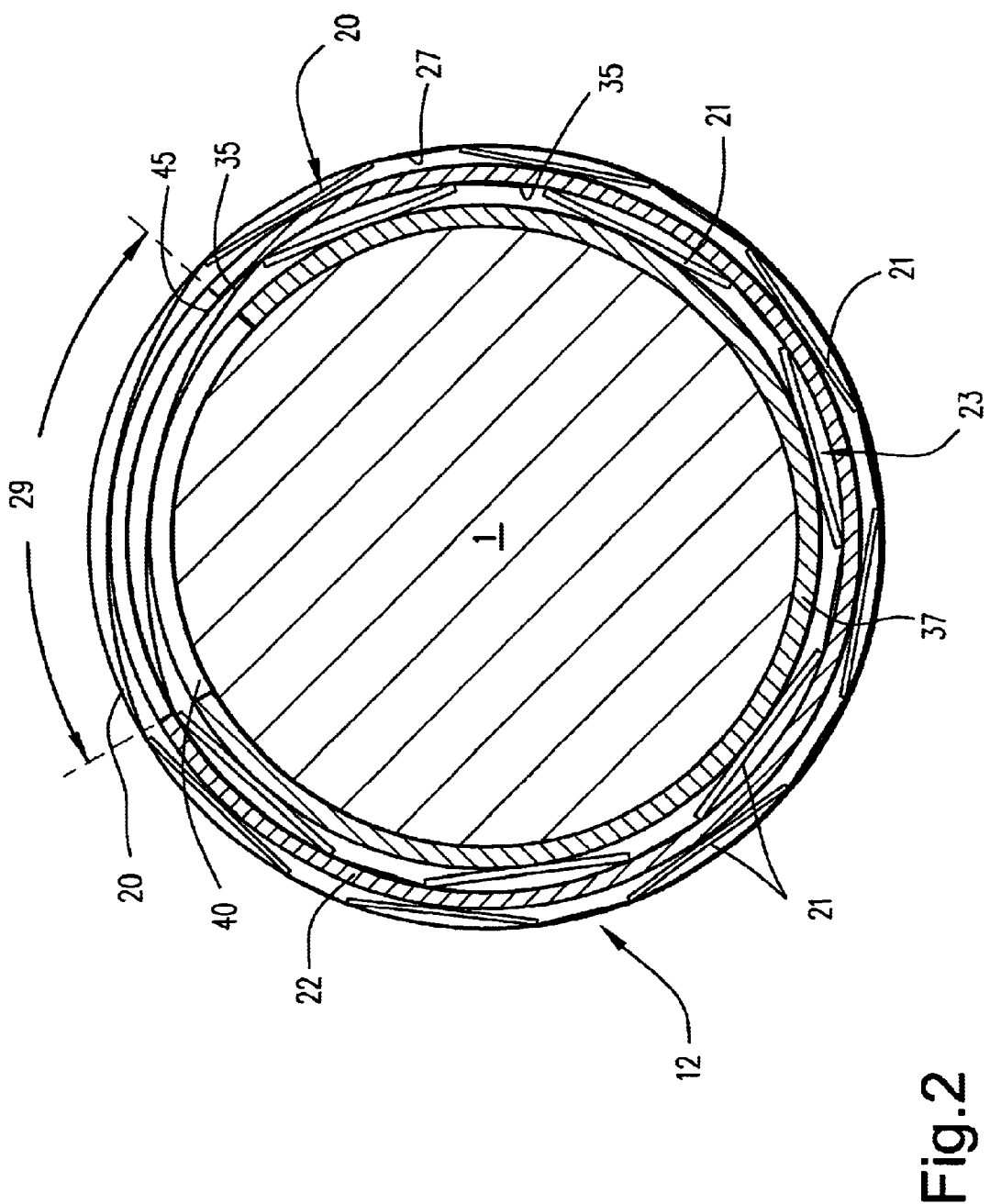
FIG. 2 is a cross-sectional view taken along line II—II of FIG. 1.
Figure 4:
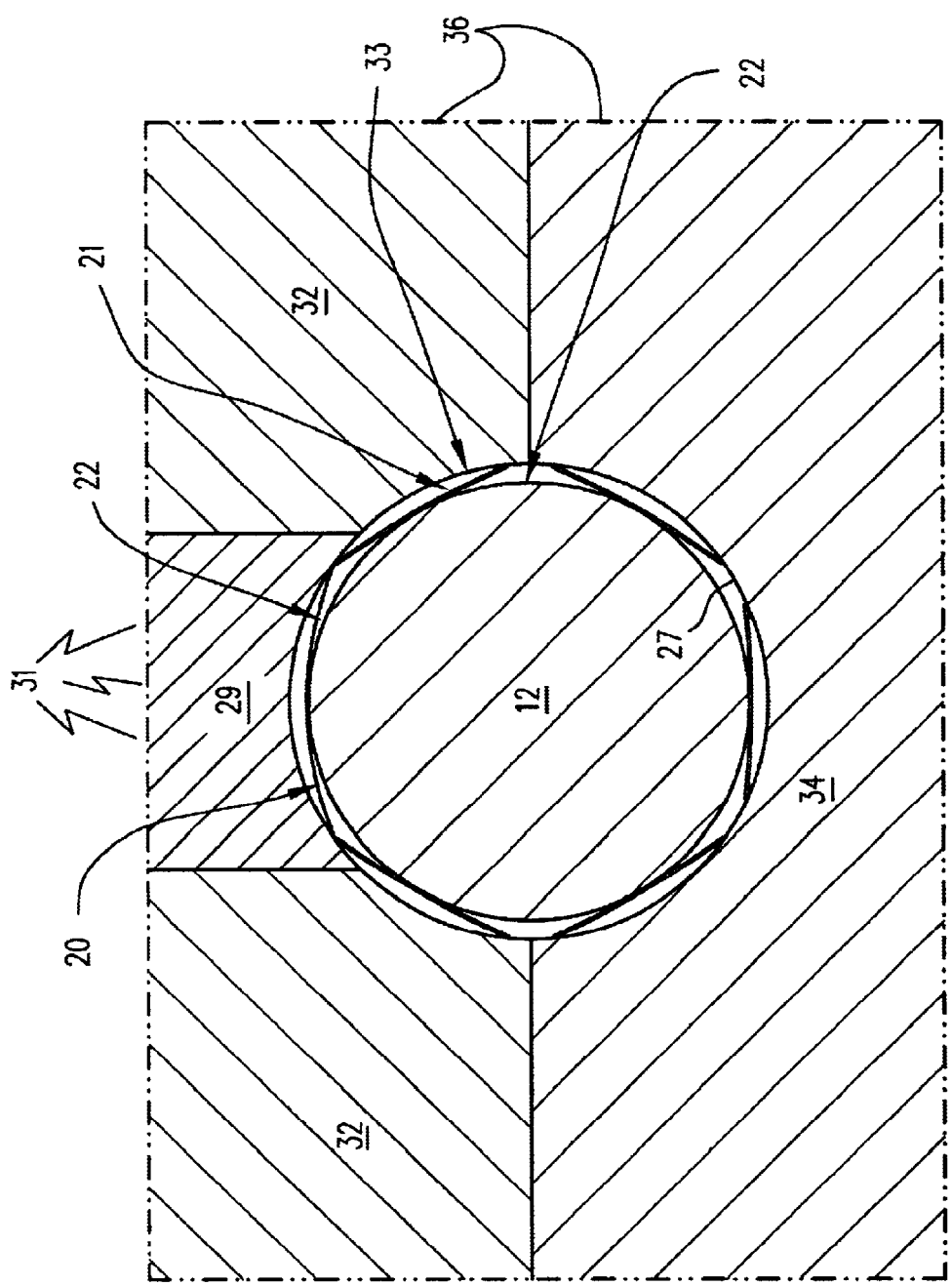
FIG. 4 is a cross-sectional view of the scintillation assembly of FIG. 2 within the flexible dynamic housing installed into a machine or tool cavity.

In this embodiment, the gamma detector assembly 11 is installed into the rigid housing 22, as more clearly illustrated in FIGS. 2–3. The rigid housing 22 in turn has been installed into an outer flexible dynamic housing assembly 20 that includes springs 21 and an outer flexible housing 27. A window opening 29, shown in FIGS. 2 and 4, is provided in a tool 36 so that gamma rays 31 can enter the scintillation assembly 12. Special window openings 45 in the rigid housing 22 are aligned to correspond to the window opening 29 in the tool 36 obviating the need for the gamma rays 31 to pass through the thick walls of the rigid housing 22. Springs 21 are omitted in this region of the scintillation assembly 12 for the same reason, that is, to minimize the amount of metal between the scintillation assembly 12 and the incoming gamma rays 31.

The scintillation assembly 12 may include a scintillation crystal 1, or other device capable of scintillation from radiation, housed within a sealed rigid scintillation housing 37 (FIG. 2). The rigid scintillation housing 37 has windows 40 corresponding to the window opening 29. Immediately surrounding the scintillation crystal 1 within the sealed housing 37 may be a reflective wrap as well as an elastomeric material, potting material, or other known support media. The scintillation crystal 1, as well as the reflective wrap, elastomeric material, or other support media, are sealed within the rigid scintillation housing 37.

Between the sealed rigid scintillation housing 37 and the rigid housing 22 is the inner flexible dynamic housing assembly 23. Referring to FIG. 2, it can be seen that a portion of the housings 27 and 35 that are over the window opening 29 are actually in contact with, respectively, the rigid housing 22 and the sealed rigid scintillation housing 37, because there are no springs 21 in that region to support the housings 27, 35.

A modern gamma detector that is to be used in a harsh environment where space is limited must simultaneously satisfy multiple, often conflicting, requirements. In order to minimize space and to offer minimum obstruction to gamma rays passing through the detector housings into the scintillation element, it is desirable to keep the housings as thin as possible. However, if the housing is thin, then it is important to not apply concentrated or uneven loads to the outside of the housing because it can deform the housing and damage the scintillation element or allow the scintillation element to be damaged by shock or vibration. Distortion of the support systems around the scintillation element or the photo-multiplier will degrade the dynamic support characteristic causing loss of performance and/or damage to the elements. These factors become particularly significant when the gamma detector is installed into an armor assembly on mining equipment or into a drilling tool. It is necessary that the detector not be loose in its assigned cavity because the induced shock may damage the components and/or introduce noise into the output. But, if the detector fits tightly, then all the dimensions of the detector and that of the cavity must be exact. Then changes in temperature, particularly rapid changes, can result in differential thermal expansion such that the detector and the structure into which it is installed do not expand at the same rate, thus causing changes in the clearances. All of these factors, along with related installation considerations, dictate that provisions be made for mechanical compliance between the detector and the cavity into which it is being installed.

As explained earlier, the outer flexible housing 27 tends to take the shape of the springs 21 until a detector, or other cylindrical instrument, is installed into a cylindrical cavity 33, at which time the outer flexible housing 27 takes on the shape of the cavity 33. If there are locations where the diameter of the cavity 33 is slightly larger than the outer flexible housing 27, there will be small gaps between the housing 27 and the wall of the cavity 33. These gaps are of no consequence. The result is that the springs 21 accommodate mechanical variations between the gamma detector assembly 11 and the machine into which it is being installed. Once installed, the springs 21 exhibit known, predictable mechanical and dynamic properties. The springs 21 retain their properties over time, plus, their properties remain essentially constant over wide temperature ranges experienced in oil well drilling applications.

Figure 5:
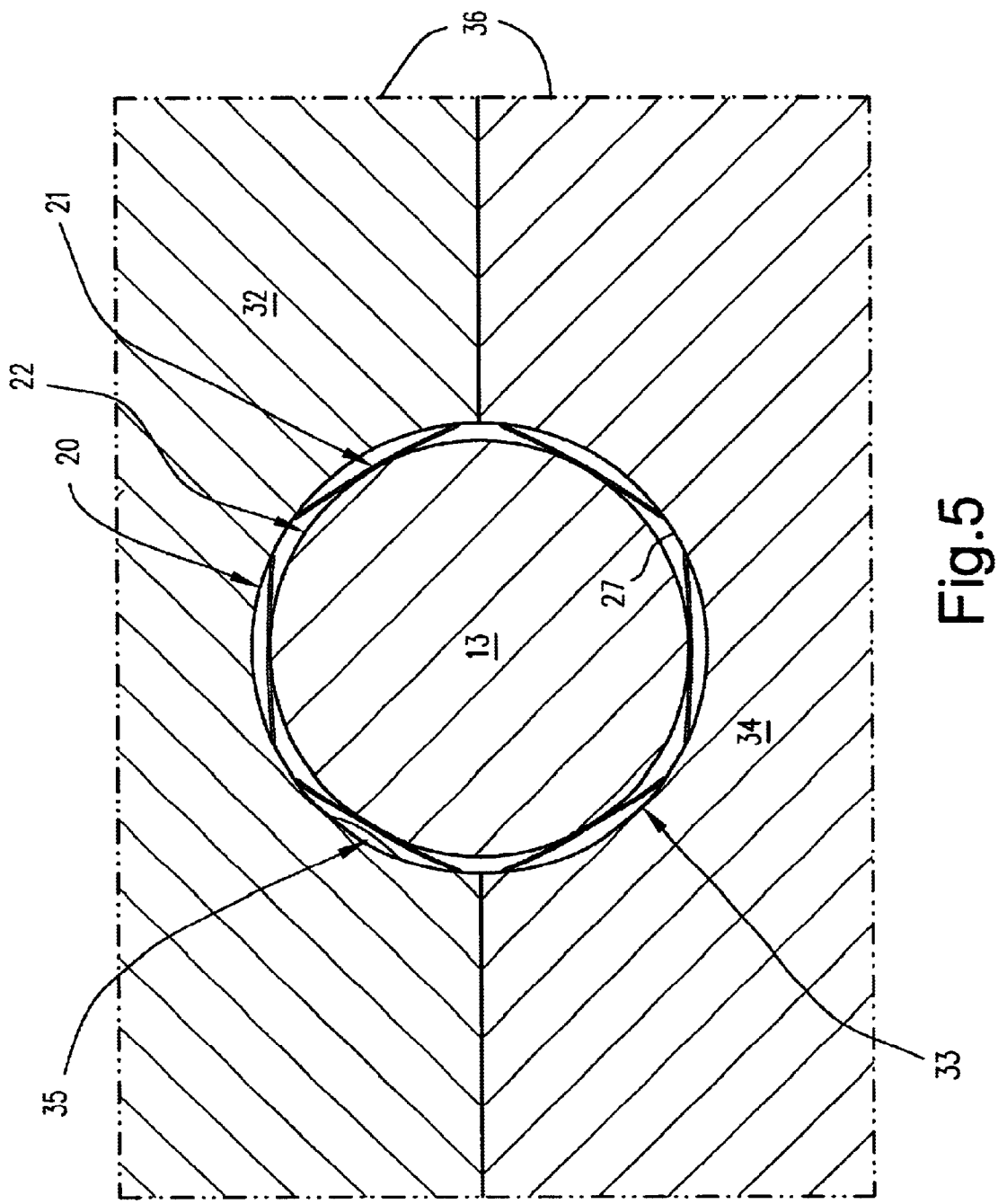
FIG. 5 is a cross-sectional view of the electronics package of FIG. 1 within the flexible dynamic housing installed into a machine or tool cavity.

A typical method of installing a gamma detector assembly 11 into a tool 36 is by use of a hatch cover. FIGS. 4 and 5 illustrate such an arrangement. One portion of the tool 36, a top portion 32, is placed in contact with a lower portion 34. A half cylinder has been milled into each portion 32, 34 so that the two portions together produce the cylindrical cavity 33 in the tool 36.

The outer flexible dynamic housing assembly 20 includes the set of linear springs 21 that extend substantially all of the length of the gamma detector assembly 11 and the outer flexible housing 27 that surrounds the springs 21. The inner flexible dynamic housing assembly 23 extends the length of the scintillation assembly 12 and the length of the electronics module 13. These springs 21 and the flexible housings 27 and 35 are typically made from stainless steel. Construction of the flexible housings 27 and 35 may include rolling a sheet of stainless steel 0.0015 inches thick to produce a total of two complete layers. The layers are bonded with a high temperature adhesive, suitable for the environment into which the device is to be used. The springs 21 typically may be selected to achieve a resonant frequency in the range of 200–600 Hertz, for a gamma detector package in a mining application or oil drilling application. Other frequencies might be selected for other applications, depending upon the frequencies of the vibrations being induced into the detector. For a detector assembly 11 that is one inch diameter, one configuration may include springs 21 that are 0.006 inches thick and 0.375 inches wide. Other sizes may be selected to alter the resonant frequency and the mechanical properties of the outer flexible dynamic housing assembly 20. It should be noted that some severe environments require the forces applied by the springs 21 to the detector assembly 11 to be hundreds of pounds. However, when such high forces are distributed evenly by the springs 21 along the length of the detector assembly 11, these forces do no damage, even to a thin walled assembly.

The second major part of the detector assembly 11 is the electronics module 13. Included in this module 13 may be a known light sensing device 5, such as a photo-multiplier tube, and an associated known electronics package 6, such as a power supply, amplifiers, discriminator circuits, memory chips, sensors, and/or programmable logic modules (FIGS. 1, 5). In these illustrations, the electronics and control functions that are typically associated with a gamma detector have been integrated into the electronics package 6 that is part of the integrated gamma detector assembly 11. The result is a compact gamma detector assembly 1, containing all the electronic functions associated with a gamma detector such that separate support modules are not required. All these electronic elements are dynamically isolated from the tool, into which they have been installed, by the flexible dynamic housing 20.

What is claimed as new and desired to be protected by Letters Patent of the United States is:

1. A gamma detector assembly having a generally cylindrical outer shape when mounted within a structure, comprising:
    a scintillation element assembly including:
        a scintillation element sealed within a rigid scintillation housing; and
        a window;
    an electronics module including a photo-multiplier tube contained within a rigid electronics module housing and optically coupled to said scintillation element through said window;
    an inner plurality of separate elongated springs surrounding said rigid scintillation housing and said rigid electronics module housing, each said elongated spring extending longitudinally along substantially the entire length of said rigid scintillation and electronics module housings; and
    an inner flexible housing surrounding said inner plurality of separate elongated springs.

2. The gamma detector assembly of claim 1, wherein said elongated springs are flat.

3. The gamma detector assembly of claim 1, wherein the structure is a mining machine having a cavity with a generally cylindrical shape into which the gamma detector assembly is mounted.

4. The gamma detector assembly of claim 1, wherein the structure is a drilling tool having a cavity with a generally cylindrical shape into which the gamma detector assembly is installed.

5. The gamma detector assembly of claim 1, further comprising an outer rigid housing surrounding said inner flexible housing.

6. The gamma detector assembly of claim 5, further comprising an outer flexible housing assembly surrounding said outer rigid housing.

7. The gamma detector assembly of claim 6, wherein said outer flexible housing assembly includes an outer flexible housing and an outer plurality of separate elongated springs, each said elongated spring extending longitudinally along substantially the entire length of said outer rigid housing.

8. An instrument package contained within a cylindrically shaped rigid housing, said rigid housing being supported by a set of elongated flat springs surrounding said rigid housing, each said spring extending longitudinally along substantially the entire length of said rigid housing and being enclosed within a flexible housing.

9. The instrument package of claim 8, wherein the package is adapted to be installed within a cavity of a mining machine.

10. The instrument package of claim 8, wherein the package is adapted to be installed within a cavity of a drilling tool.

11. The instrument package of claim 8, further comprising a scintillation element assembly sealed within said rigid housing.

12. The instrument package of claim 11, further comprising an electronics module sealed within said rigid housing and optically coupled to said scintillation element assembly.

13. An instrument package contained within a cylindrically shaped rigid housing, said rigid housing being supported by a set of elongated flat springs surrounding said rigid housing, each said spring extending longitudinally along substantially the entire length of said rigid housing and being enclosed within a flexible housing; wherein said springs are placed such that there is a gap between two of said springs to suppress obstruction of gamma rays at that location.

* * * * *